(12) United States Patent
Abarotin

(10) Patent No.: US 12,350,970 B2
(45) Date of Patent: Jul. 8, 2025

(54) HEAVY TRUCK TIRE TREAD AND HEAVY TRUCK TIRE

(71) Applicant: COMPAGNIE GENERALE DES ETABLISSEMENTS MICHELIN, Clermont-Ferrand (FR)

(72) Inventor: Victor Abarotin, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 18/457,468

(22) Filed: Aug. 29, 2023

(65) Prior Publication Data
US 2023/0406044 A1    Dec. 21, 2023

Related U.S. Application Data

(63) Continuation-in-part of application No. 16/648,065, filed as application No. PCT/US2017/058984 on Oct. 30, 2017, now abandoned.

(51) Int. Cl.
*B60C 11/12* (2006.01)
*B60C 11/03* (2006.01)

(52) U.S. Cl.
CPC ...... *B60C 11/1236* (2013.01); *B60C 11/0302* (2013.01); *B60C 11/1259* (2013.01); *B60C 2011/0346* (2013.01); *B60C 2011/129* (2013.01); *B60C 2200/06* (2013.01)

(58) Field of Classification Search
CPC . B60C 11/1259; B60C 11/0302; B60C 11/12; B60C 11/04; B60C 2011/129; B60C 2200/06; B60C 2200/065
See application file for complete search history.

(56) References Cited

U.S. PATENT DOCUMENTS

| 2,094,636 A | 10/1937 | Bull |
| 4,756,352 A | 7/1988 | Ogawa et al. |
| 4,878,526 A | 11/1989 | Ochiai |

(Continued)

FOREIGN PATENT DOCUMENTS

| CA | 2000945 A1 | 4/1990 |
| CN | 107031304 A | 8/2017 |

(Continued)

OTHER PUBLICATIONS

European Patent Office, International Search Report and Written Opinion for PCT/US2017/058984 dated Jul. 24, 2018, pp. 1-10 (included), European Patent Office, Rijswijk, The Netherlands.

*Primary Examiner* — Cedrick S Williams
(74) *Attorney, Agent, or Firm* — Neal P. Pierotti

(57) ABSTRACT

The invention provides for a heavy truck tire tread (2) having a longitudinal direction (X), a lateral direction (Y) and a thickness direction (Z), said tread comprising:
longitudinal grooves (20) separating longitudinal ribs;
a pair of opposing tread edges (21, 21') spaced apart along the lateral direction;
a pair of shoulder ribs (22, 22'), each shoulder rib being adjacent to a respective tread edge of said pair of tread edges;
wherein the shoulder ribs are solid ribs comprising lateral full depth sipes (23, 23') running at a sipe angle (α) relative to the lateral direction (Y) and;
wherein an average sipe angle (αA) over a center portion of said shoulder ribs is greater than 30° in absolute value.

9 Claims, 4 Drawing Sheets

(56) References Cited

U.S. PATENT DOCUMENTS

| | | | | |
|---|---|---|---|---|
| 5,196,076 | A | * 3/1993 | Ochiai | ............ B60C 3/04 |
| | | | | 152/538 |
| 2014/0130949 | A1 | 5/2014 | Maehara | |
| 2017/0066291 | A1 | 3/2017 | Hiraishi | |
| 2018/0134089 | A1 | 5/2018 | Durand-Gasselin | |
| 2018/0162166 | A1 | 6/2018 | Hiraishi | |
| 2019/0184760 | A1 | 6/2019 | Cerny et al. | |

FOREIGN PATENT DOCUMENTS

| | | | | |
|---|---|---|---|---|
| EP | 199570 | A | * 10/1986 | ......... B60C 11/04 |
| EP | 3378678 | B1 | 9/2018 | |
| JP | H0253609 | A | 2/1990 | |
| JP | H11105513 | A | 4/1999 | |
| JP | 2002144821 | A | 5/2002 | |
| JP | 2002362115 | A | 12/2002 | |
| JP | 2003011619 | A | 1/2003 | |
| JP | 2011225105 | A | 11/2011 | |
| JP | 2012153156 | A | 8/2012 | |
| JP | 2017074845 | A | 4/2017 | |
| KR | 20070097828 | A | 10/2007 | |
| WO | 2015176958 | A1 | 11/2015 | |
| WO | 2019066839 | A1 | 4/2019 | |

* cited by examiner

HEAVY TRUCK TIRE TREAD AND HEAVY TRUCK TIRE

CROSS-REFERENCE TO RELATED APPLICATIONS

The present application is a continuation-in-part (CIP) application of U.S. patent application Ser. No. 16/648,065 filed on Mar. 17, 2020 and titled "Heavy Truck Tire Tread and Heavy Truck Tire." U.S. patent application Ser. No. 16/648,065 is a 35 U.S.C. § 371 application of PCT/US17/58984 filed on Oct. 30, 2017 and entitled "Heavy Truck Tire Tread and Heavy Truck Tire." PCT/US17/58984 and U.S. patent application Ser. No. 16/648,065 are incorporated by reference herein in their entireties for all purposes.

FIELD OF THE INVENTION

This invention relates generally to tire treads and tires. More specifically, this invention relates to tire treads and tires best suitable for the drive axle(s) of heavy trucks such as the drive axle(s) of tractors used in tractor-semi-trailer combinations or of single unit straight trucks.

BACKGROUND OF THE INVENTION

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread elements, such as ribs or lugs, and tread features, such as grooves and sipes, each of which may assist in providing target tire performance when a tire is operating under particular conditions.

One problem with treads for drive tires is the compromise between traction, rolling resistance and wear/abnormal wear.

It is known that adding sipes in a tire rib can improve wear rate and traction. But it has never been used successfully in the shoulder ribs of drive tires for the long-haul trucking application because it often triggers abnormal wear. The shoulders of long-haul drive tires are therefore typically designed with solid ribs, with no full-width transverse sipes or full-depth transverse grooves. As a result, the design of long-haul drive tire treads is sacrificing shoulder rib wear rate and traction in order to avoid abnormal wear.

SUMMARY OF THE INVENTION

The invention provides for a heavy truck tire tread having a longitudinal direction, a lateral direction and a thickness direction, said tread comprising:
  longitudinal grooves separating longitudinal ribs;
  a pair of opposing tread edges spaced apart along the lateral direction;
  a pair of shoulder ribs, each shoulder rib being adjacent to a respective tread edge of said pair of tread edges;
  wherein the shoulder ribs are solid ribs comprising lateral full depth sipes running at a sipe angle relative to the lateral direction and;
  wherein an average sipe angle over a center portion of said shoulder ribs is greater than 30° in absolute value.

In another embodiment, the average sipe angle over the center portion of said shoulder ribs is less than 70° in absolute value.

In another embodiment, the average sipe angle over the center portion of said shoulder ribs is greater than 35° and less than 55° in absolute value.

In another embodiment, said sipe angle is less than 30° in absolute value at a point where the sipe exits the shoulder rib towards the tread edge.

In another embodiment, a ratio of the average sipe depth with the average distance between consecutive sipes is at least 0.3.

In another embodiment, the ratio of the average sipe depth with the average distance between consecutive sipes is between 0.5 and 1.5.

In another embodiment, said sipe exits into a shoulder notch of the shoulder rib towards the tread edge.

In another embodiment, the sipes are oriented relative to the rolling direction (RD) such that the interior end of the sipe at the shoulder groove makes contact with the ground before the exterior end of the sipe at the tread edge.

The invention also provides for a heavy truck tire comprising such a tread.

The foregoing and other objects, features and advantages of the invention will be apparent from the following more detailed descriptions of a particular embodiment of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF PARTICULAR EMBODIMENTS

Figure 1:
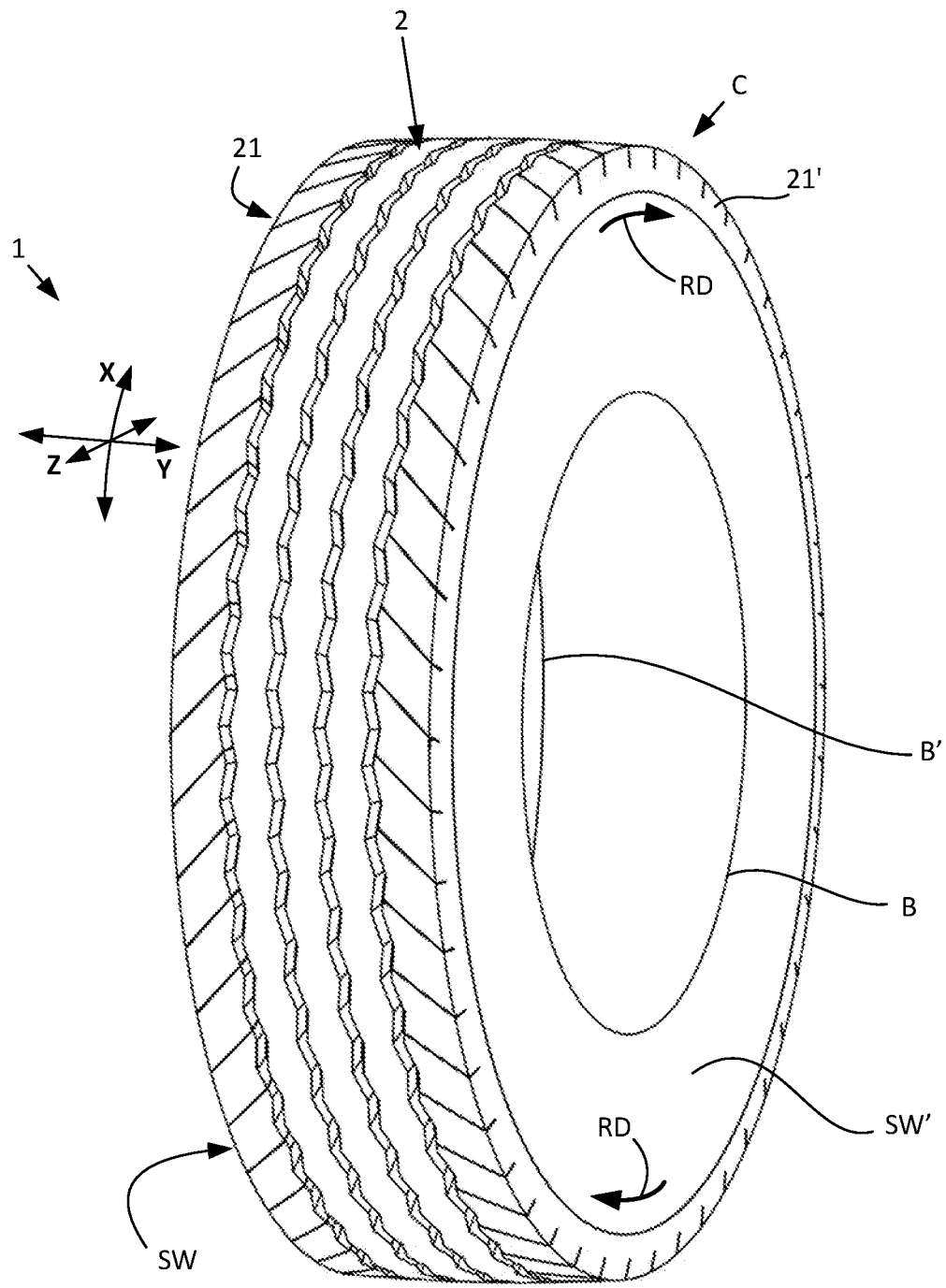
FIG. 1 is a perspective view of a heavy truck tire comprising an embodiment of the disclosed tire tread.

Reference will now be made in detail to embodiments of the invention, examples of which are illustrated in the drawings. These examples are provided by way of explanation of the invention.

As shown in FIG. 1, a heavy truck tire 1 generally comprises a crown portion C connected by respective sidewalls SW, SW' to beads portions B, B'. The crown portion comprises a tread 2 according to an embodiment of the invention. The design of the tread is substantially symmetric, that is to say that the tread features are arranged substantially symmetrically about the center plane of the tread. This tread is said to be of a directional design because it has a different appearance according to which side it is oriented. A directional tire or tread does not only look differently but it also performs differently if used in one rolling direction or the other. This is why directional treads or tires conventionally bear markings that indicate the designed rolling direction. Such markings may take the form of arrows RD pointing in the designed rolling direction. Using the tire for rolling in the opposite direction would be detrimental to its best performance.

Figure 2:
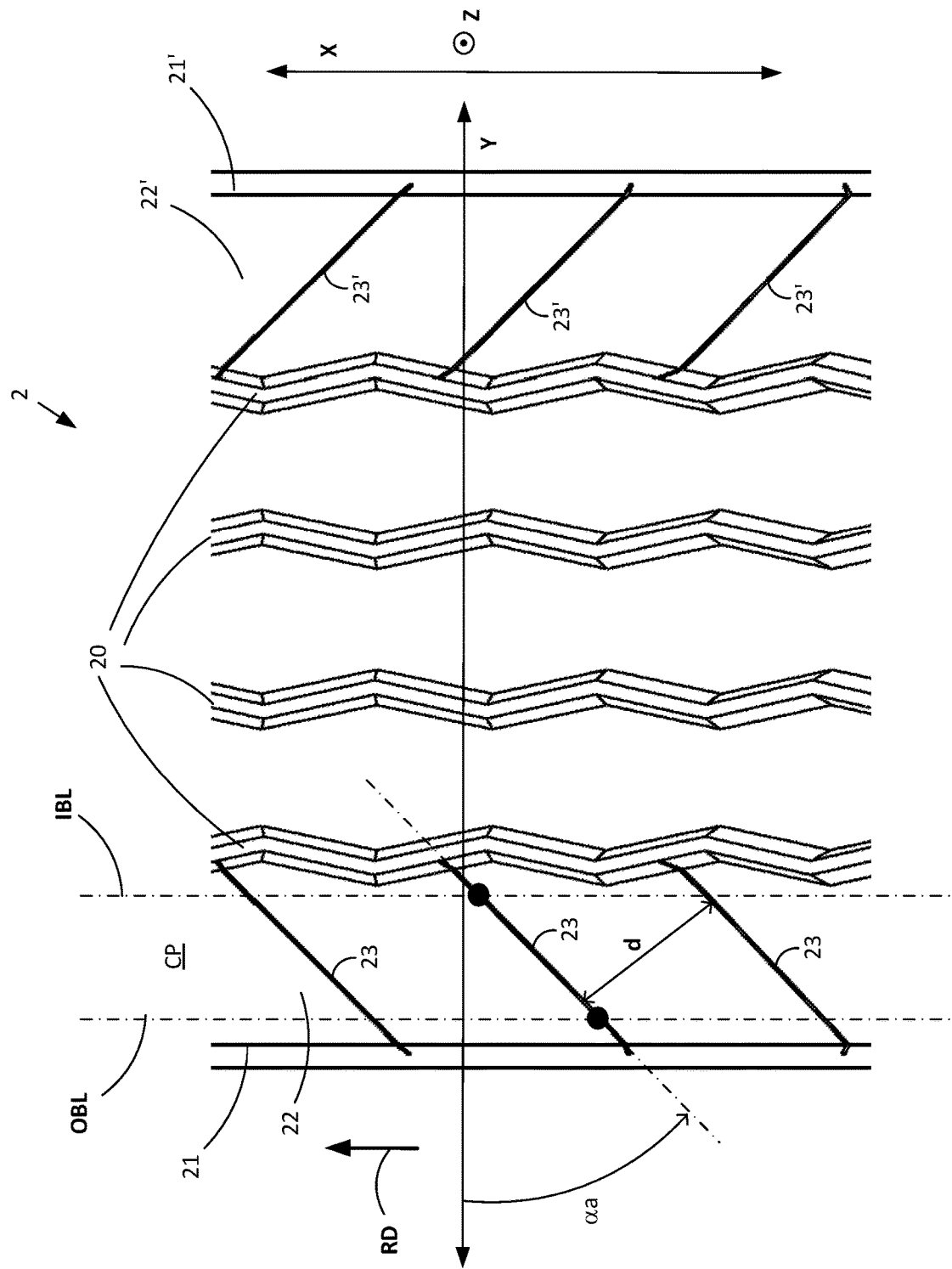
FIG. 2 is a front view of part of the tread of FIG. 1 showing details of its design at a much bigger scale.

FIG. 2 is a magnified and flattened projection view of a portion of the tread 2 of FIG. 1. As shown in FIG. 2, the tread has a longitudinal direction X (also referred to as the circumferential direction of the tire), a lateral direction Y (also referred to as the axial or transverse direction) and a thickness direction Z (also referred to as the tread depth direction).

The tread depth is generally defined as the distance between the tread contact surface and a translation of this contact surface to be tangent to the deepest features in the tread.

The tread has respective tread edges 21, 21' on each side and longitudinal ribs defined by longitudinal grooves 20 separating the ribs. Longitudinal grooves may be straight or undulate along their main direction as represented in the FIGS. The ribs defined between the respective shoulder grooves and tread edges are referred to as shoulder ribs 22, 22'. Shoulder ribs are solid ribs comprising lateral sipes 23 running across them and connecting the shoulder grooves to the tread edges. A sipe is the narrow space formed in a tread between walls of material over a depth at most equal to the tread depth, said walls being able, at least in part, to come into contact with one another in the usual running conditions of the tire. Sipes are generally made as thin as manufacturing would reasonably allow, most of the time under 1 mm and preferably at around 0.5 mm. Sipes 23 are full depth sipes. Sipes are said to be full depth sipes when their average depth is at least 50% of the tread depth.

As shown on the left side of FIG. 2, a center portion CP of the shoulder rib is defined between an outer boundary line OBL and an inner boundary line IBL. The outer boundary line OBL is a longitudinal straight line running at an average distance of 8 mm from the tread edge 21. The inner boundary line IBL is a longitudinal straight line running at an average distance of 5 mm from the interior edge of the shoulder rib, adjacent to the shoulder groove 20.

The orientation of a lateral sipe 23 is defined by its angle $\alpha$ relative to the lateral direction Y. A certain angle $\alpha$ can be measured in any location along the sipe. This local angle $\alpha$ can be a constant value in the case of a straight sipe but a can also vary significantly along the length of the sipe. To characterize the main orientation of the sipe, an average sipe angle $\alpha a$ is defined in the center portion CP of the rib. The average sipe angle $\alpha a$ is defined as the angle relative to the lateral direction Y of a straight line connecting the points where the sipe intersects the inner and outer boundary lines IBL, OBL. According to the invention, this average angle is greater than 30° and preferably less than 70° in absolute value. Using absolute value to characterize an angle is a way to focus on its magnitude and ignore its direction.

A distance d can be measured between consecutive sipes. A sipe density SD can be established as the ratio of the average sipe depth ASD with the average distance d (SD=ASD/d).

Figure 3:
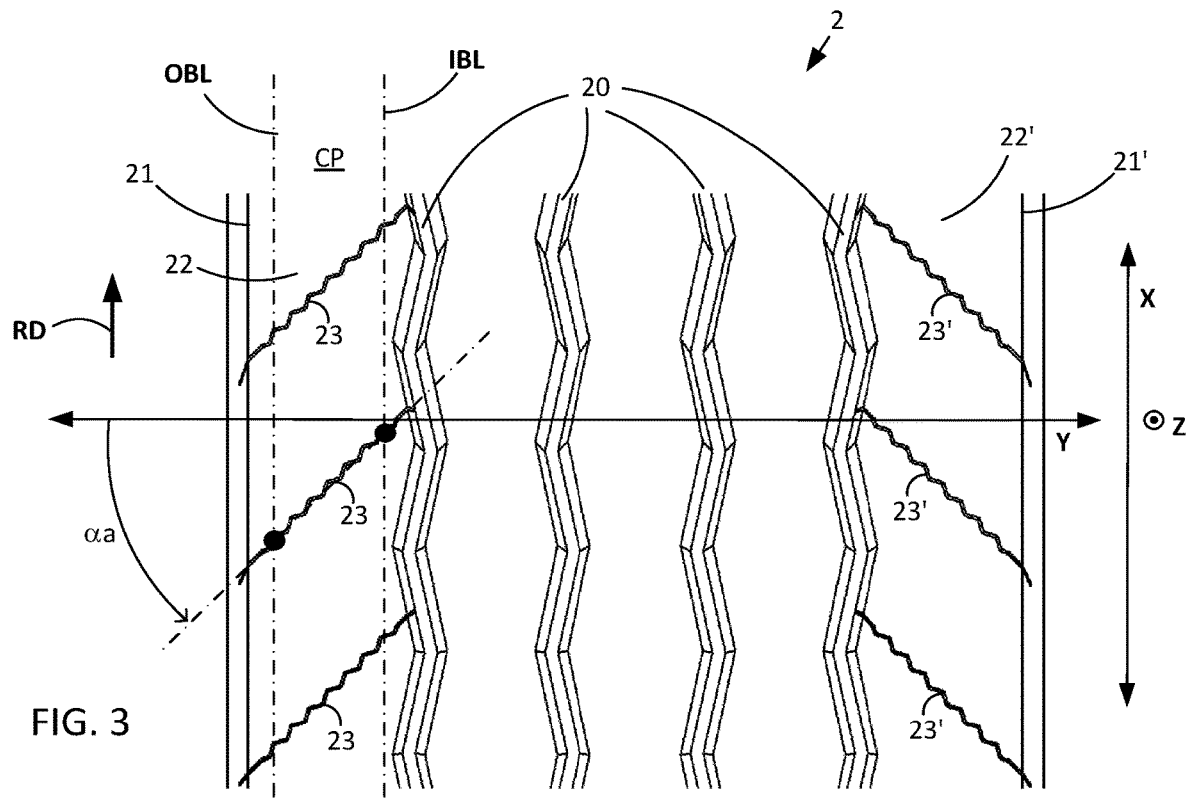
FIGS. 3 to 6 are front views similar to that of FIG. 2 showing other embodiments of the tread.

FIG. 3 shows another embodiment where the sipes are undulating (zigzagging) along their main direction. Undulated sipes promote tread stiffness due to the sipe walls interlocking when loaded on the ground. Undulations may have many different shapes and can typically be one-directional (so called zigzag sipes) or bi-directional (so called egg-crate sipes). This FIG. also illustrates the fact that the local sipe angle $\alpha$ may vary to a large extent while the average sipe angle $\alpha a$ is maintained between 30° and 70°.

Figure 4:
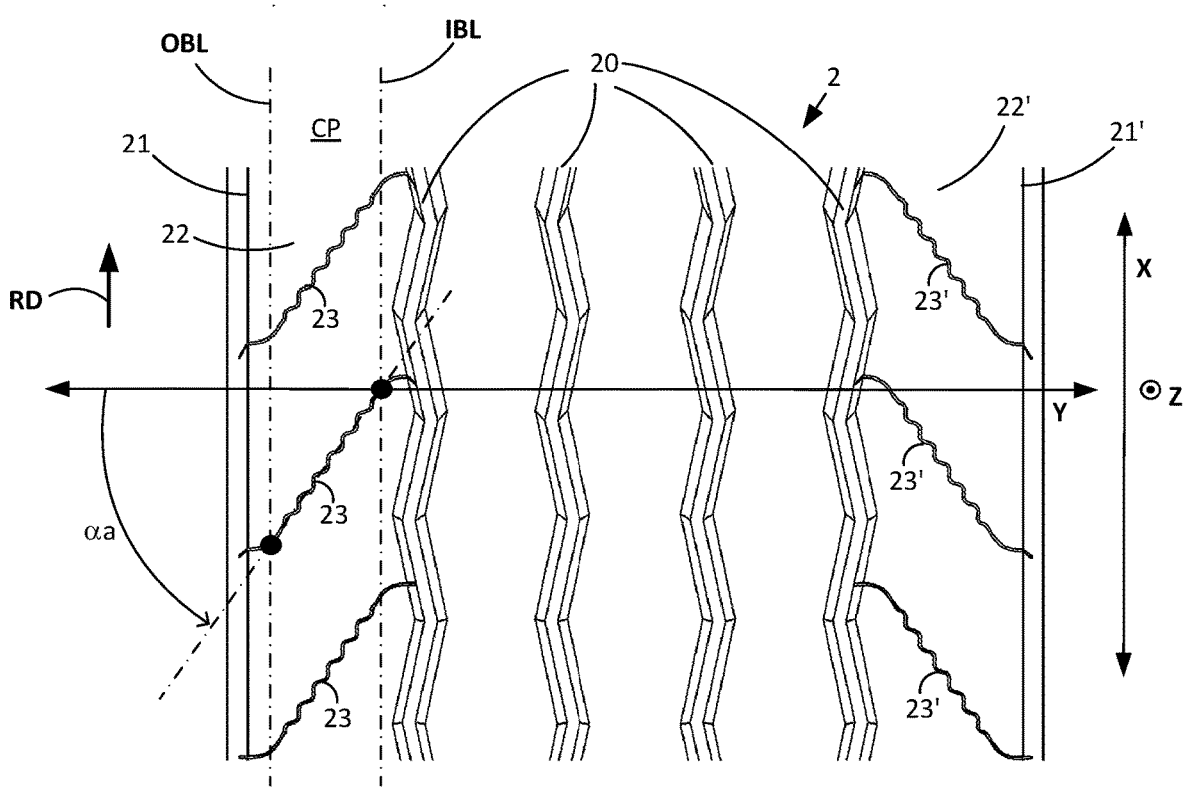

FIG. 4 shows yet another embodiment where the sipes exit to the sides of the shoulder rib at a lower angle, typically less than 30°.

Figure 5:
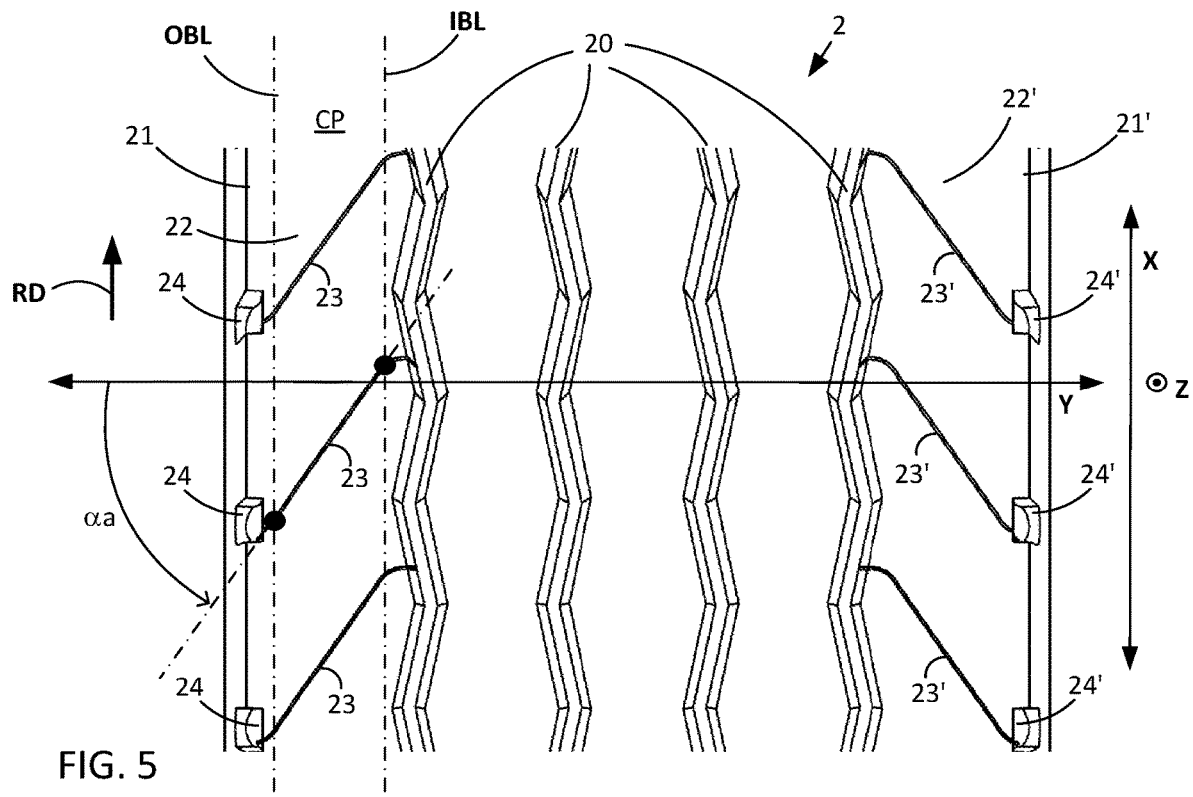

FIG. 5 shows yet another embodiment where the sipes exit to the outside of the shoulder rib into notches 24 that are recessed from the tread edges. Tread edge notches do not affect the definition of the location of the outer boundary line OBL.

In FIGS. 1 to 5, each side of the tread is represented as being symmetric to the other side of the tread relative to a center (or equatorial) plane of the tread. But a tread according to the invention may also comprise tread halves that are notably different as long as each tread half remains within the scope of the invention as limited by the claims.

Figure 6:
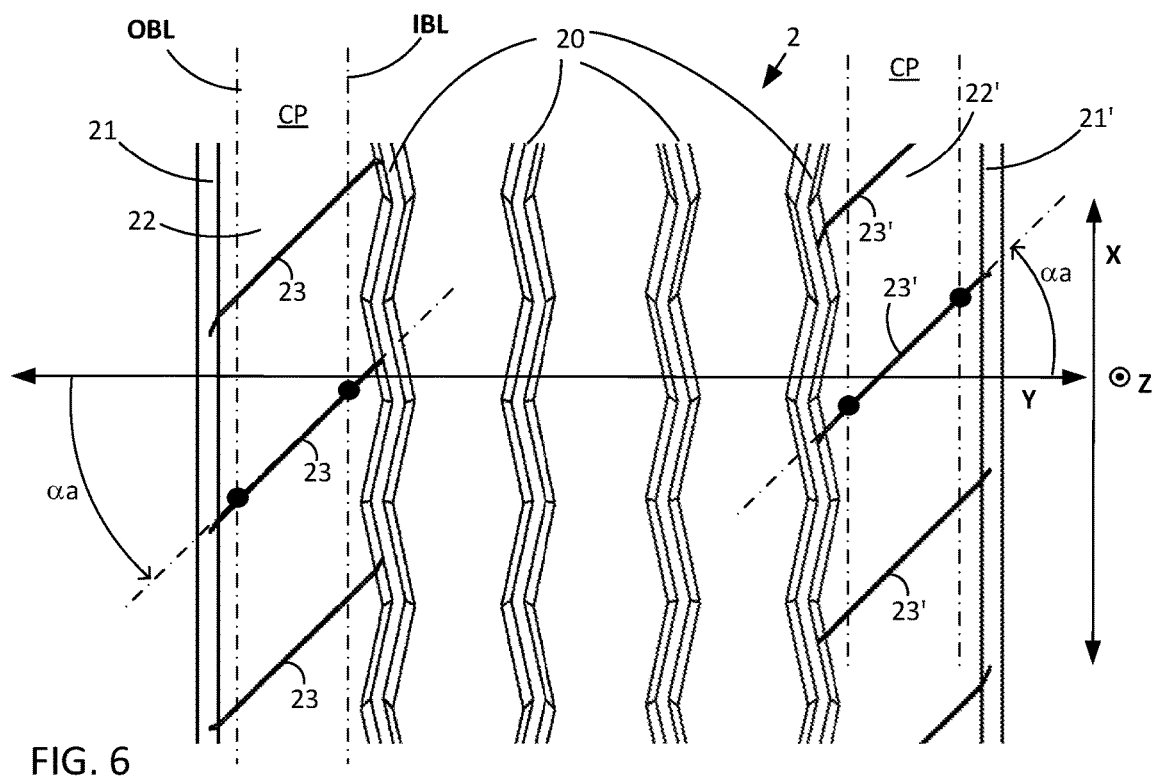

FIG. 6 shows a tread similar to that of FIG. 2 except for the fact that its pattern is made non-directional by having the sipe angles on one side of the tread reversed. This illustrates the fact that the tread may be directional as shown in FIGS. 1 to 5 as well as non-directional.

In the drawings, the grooves are shown in the generic and conventional shape of fully open grooves but they could be of many other forms. They may for instance be partially hidden grooves, that is to say, grooves that may not be always fully open to the tread surface. Such grooves may for example undulate along their length between a lower position where they are only connected to the surface by a sipe and a higher position where they are fully open at the surface. Partially hidden grooves may also consist in an under-surface duct connected to the surface by a series of radially extending passages.

The tread may also have shallow depressions, markings or engravings in otherwise solid shoulder ribs. Such shallow features and are intended to wear out during the early wear life of the tread and do not affect the stiffness of the ribs.

Information Added in Continuation-In-Part Application

Applicant has discovered that other average sipe angles $\alpha a$ can be used that further refine the design and provide shoulder rib wear rate and traction improvements. In certain embodiments, the average sipe angles $\alpha a$ can be from 61°-85°, from 61°-65°, from 66° from 71°-75°, from 76°-80°, from 81°-85°, from 61°-70°, from 65°-75°, from 70°-80°, from 75°-85°, from 61°-74°, from 66°-84°, from 71°-84°, from 63°-71°, from 64°-74°, from 62°-79°, or from 75°-84°. In other embodiments, the average sipe angles $\alpha a$ can be from 25° from 25°-40°, from 25°-45°, from 25°-29°, from 26°-29°, from 26°-34°, from 25°-55°, greater than 25° and less than 55°, or from 28°-34°. The sipes 23 in these embodiments can be arranged so that they overlap in the longitudinal direction X, or so that they do not overlap in the longitudinal direction X.

The sipes 23 shown in FIG. 2 do not overlap in the longitudinal direction X. To describe non-overlapping sipes 23, the sipe 23 may have a unique location in the longitudinal direction X such that no other sipe in the same shoulder rib 22 shares a common location in the longitudinal direction X with the sipe 23. As such, the intersection of the sipe 23 with the shoulder edge 21 may be unique in the longitudinal direction X to the sipe 23, the intersection of the sipe 23 with the first shoulder groove may be unique in the longitudinal direction X to the sipe 23, and the entire length of the sipe 23 between these two points may be unique to the sipe 23 so that no other sipe in the shoulder rib 22 shares any common location in the longitudinal direction X. In this regard, the sipes 23 in the shoulder rib 22 are said to be offset completely in the longitudinal direction X. To describe overlapping sipes, it would be the case that the sipe 23 has a portion (either at the intersection of the shoulder edge 21, the intersection of the shoulder groove 20, or any other section of the sipe 23) that is common to an additional sipe in the shoulder rib 22 in the longitudinal direction X. It is to be understood that the sipes 23' in the other shoulder rib 22' can be arranged with the aforementioned average sipe angles αa and can likewise be either overlapping or non-overlapping as described.

In accordance with other exemplary embodiments, Applicant has further discovered that traction performance and shoulder rib wear rate may be improved if the sipes 23 are non-overlapping and have the average sipe angles αa from 41°-85°, from 41°-45°, from 41°-50°, from 41°-55°, from 41°-60°, from 41°-65°, from 41°-70°, from 41°-75°, from 41°-80°, from 46°-84°, from 51°-84°, from 56°-84°, from 61°-84°, from 66°-84°, from 71°-84°, from from 48°-54°, from 55°-58°, from 57°-75°, from 57°-67°, from 46°-74°, from 52°-68°, from 56°-64°, from 41°-44°, from 45°-49°, from 50°-55°, from 51°-54°, from 54°-59°, from 57°-64°, from 57°-71°, from 57°-78°, from 51°-75°, from 51°-68°, from 51°-59°, from 46°-68°, from 46°-64°, from 46°-58°, from 48°-68°, from 42°-58°, from 54°-64°, from 50°-70°, or from 55°-85°. It is to be understood that the sipes 23' in the other shoulder rib 22' can be arranged with the aforementioned average sipe angles αa and are likewise non-overlapping as described (no other sipe 23 in the shoulder rib 22 shares any common position in the longitudinal direction X with the sipe 23). All of the sipes 23 in the shoulder rib 22 may be non-overlapping as described, and the sipes 23' in the other shoulder rib 22' may be configured the same way as just described and also be non-overlapping. The average sipe angles αa can be the angle measured as shown in the figures where the sipes 23, 23' extend from the shoulder grooves 20 opposite to the rolling direction RD.

Applicant has discovered that wear rate can be improved if sipes 23 are provided with a sipe density SD that is the ratio of the average sipe depth ASD with the average distanced between consecutive sipes (SD=ASD/d) that is from 0.5-1.0, from 0.3-1.0, from 0.4from 0.5-0.8, from 0.5-0.7, from 0.5-0.6, from 0.4-1.0, from 0.4-0.8, from 0.3-0.9, from from 0.4-0.6, from 0.4-0.5, from 0.3-0.8, from 0.3-0.7, from 0.3-0.6, from 0.3-0.5, from 0.2-1.0, from 0.2-0.9, from 0.2-0.8, from 0.2-0.7, from 0.2-0.6, from 0.2-0.5, from from 0.2-0.3, from 0.6-1.0, from 0.6-0.9, from 0.6-0.7, from 0.7-1.0, from 0.7-0.9, from from 0.8-1.0, from 0.8-0.9, from 0.9-1.0, less than 1.0, less than 0.9, less than 0.8, less than 0.7, less than 0.6, less than 0.5, less than 0.4, less than 0.3, or less than 0.2. It is to be understood that when claiming or describing a range herein that the range includes the defined boundary/limits as well. As the value of d may change due to variations within the sipes 23, the value d can be the perpendicular distance of the straight line connecting the points where the sipe 23 intersects the inner and outer boundary lines IBL, OBL with the other straight line of the successive sipe 23 that likewise intersects the IBL and OBL. In order to calculate the average sipe depth ASD, depth measurements of the sipe 23 between the IBL and OBL can be taken such that the average of the deepest part of the sipe 23, the shallowest part of the sipe 23, and then 2 random parts of the sipe 23 is obtained. If the sipe 23 does not vary in depth, the average sipe depth ASD is simply the depth of the sipe 23 from the upper surface.

An example of calculating the sipe density SD is as follows. The distance din this example is measured as 30 millimeters, and the average sipe depth ASD is measured as 15 millimeters. The sipe density SD is calculated as SD=ASD/d=15 millimeters/30 millimeters=0.5.

The configuration of the sipe 23 can be arranged from the IBL to the shoulder groove 20 such that the sipe 23 in this zone is arranged at an angle lower than the average sipe angle αa that is within the OBL and IBL. The angle of the sipe 23 at this area may be from 2°-20°, from 5°-20°, from 10°-20°, from 5°-15°, or from 10°-35° in accordance with certain exemplary embodiments. The sipe 23 is shown as having this angle reduced in this zone with reference to FIGS. 4 and 5, and does not have a reduced angle in the embodiments illustrated in FIGS. 2, 3 and 6. The sipes 23' in the other shoulder rib 22' can be arranged in a corresponding manner with respect to the average sipe angle αa in the sipe 23' and a repeat of this information is not necessary.

It will be apparent to those skilled in the art that various modifications and variations can be made in the present invention without departing from the scope or spirit of the invention. For instance, features illustrated or described as part of one embodiment, can be used with another embodiment to yield a still further embodiment. As already discussed above, a tread or tire according to the invention may also comprise tread halves that are notably different from one another as long as each tread half remains within the scope of the invention as limited by the claims. Thus, it is intended that the present invention covers such modifications and variations as they fall within the scope of the appended claims and their equivalents.

The invention claimed is:

1. A heavy truck tire tread having a longitudinal direction, a lateral direction and a thickness direction, said tread comprising:
    longitudinal grooves separating longitudinal ribs, wherein two of the longitudinal grooves are a first shoulder groove and a second shoulder groove;
    a pair of opposing tread edges spaced apart along the lateral direction;
    a pair of shoulder ribs, each shoulder rib being adjacent to a respective tread edge of said pair of tread edges;
    wherein the shoulder ribs are solid ribs comprising sipes running at a sipe angle (a) relative to the lateral direction, wherein the sipes extend completely across the shoulder ribs from the shoulder grooves to the tread edges, wherein the sipes are full depth and lateral and;
    wherein an average sipe angle (αA) relative to the lateral direction measured at upper surfaces of said shoulder ribs between said first and second shoulder grooves and said tread edges over a center portion of said shoulder ribs is from 66°-84°;
    wherein the sipes are oriented relative to the rolling direction (RD) such that interior ends of the sipes at the first and the second shoulder grooves make contact with ground before exterior ends of the sipes at the tread edges;
    wherein the first one of the sipes intersects the tread edge at the first shoulder rib at a unique location in the longitudinal direction such that no other ones of the sipes in the first shoulder rib have a position in the longitudinal direction that is at the same position in the longitudinal direction as the unique location; and
    wherein the first one of the sipes is located in the first shoulder rib such that no other sipe in the first shoulder rib shares a common location in the longitudinal direction with any portion of the first one of the sipes.

2. The heavy truck tire tread as set forth in claim 1, wherein a ratio (SD) of an average sipe depth (ASD) with an average distance between consecutive sipes (d) is from 0.3-1.0.

3. A heavy truck tire tread having a longitudinal direction, a lateral direction and a thickness direction, said tread comprising:

longitudinal grooves separating longitudinal ribs, wherein two of the longitudinal grooves are a first shoulder groove and a second shoulder groove;

a pair of opposing tread edges spaced apart along the lateral direction;

a pair of shoulder ribs, each shoulder rib being adjacent to a respective tread edge of said pair of tread edges;

wherein the shoulder ribs are solid ribs comprising sipes running at a sipe angle ($\alpha$) relative to the lateral direction, wherein the sipes extend completely across the shoulder ribs from the shoulder grooves to the tread edges, wherein the sipes are full depth and lateral;

wherein an average sipe angle ($\alpha A$) relative to the lateral direction measured at upper surfaces of said shoulder ribs between said first and second shoulder grooves and said tread edges over a center portion of said shoulder ribs is from 66°-84° in absolute value;

wherein the sipes are oriented relative to the rolling direction (RD) such that interior ends of the sipes at the first and the second shoulder grooves make contact with ground before exterior ends of the sipes at the tread edges; and wherein a ratio (SD) of an average sipe depth (ASD) with an average distance between consecutive sipes (d) is from 0.3-1.0.

4. The heavy truck tire tread of claim 3, wherein the ratio (SD) of the average sipe depth (ASD) with the average distance between consecutive sipes (d) is from 0.5-0.8.

5. The heavy truck tire tread of claim 3, wherein the sipes in the pair of shoulder ribs are symmetrical about a center plane of the tread, wherein the pair of shoulder ribs include a first shoulder rib and a second shoulder rib, wherein a first one of the sipes in the first shoulder rib is symmetrical to a second one of the sipes in the second shoulder rib about the center plane of the tread, and wherein a first intersection between the first one of the sipes and the first shoulder groove is located at a same place in the longitudinal direction as a second intersection between the second one of the sipes and the second shoulder groove;

wherein the first one of the sipes terminates at the first shoulder groove at the first intersection, and wherein the second one of the sipes terminates at the second shoulder groove at the second intersection, and wherein a closest one of the sipes in the truck tire tread in the lateral direction to the first one of the sipes at the first intersection is the second one of the sipes at the second intersection such that none of the other sipes share the same place in the longitudinal direction with the first and second intersections;

wherein the first one of the sipes intersects the tread edge at the first shoulder rib at a unique location in the longitudinal direction such that no other ones of the sipes in the first shoulder rib have a position in the longitudinal direction that is at the same position in the longitudinal direction as the unique location; and wherein the first one of the sipes is located in the first shoulder rib such that no other sipe in the first shoulder rib shares a common location in the longitudinal direction with any portion of the first one of the sipes.

6. The heavy truck tire tread of claim 3, wherein said sipe angle (a) is less than 30° in absolute value from an outer boundary line that is at an average distance of 8 millimeters in the lateral direction from the tread edge at the first shoulder rib to a point where the sipe exits the first shoulder rib towards the tread edge at the first shoulder rib.

7. The heavy truck tire tread of claim 3, wherein said sipe exits into a shoulder notch of the shoulder rib towards the tread edge.

8. The heavy truck tire tread of claim 3, further comprising sidewalls attached to the tread that extend from the tread in the thickness direction, and wherein beads are located at the ends of the sidewalls.

9. The heavy truck tire tread of claim 3, wherein the sipes from the first shoulder groove to an inner boundary line (IBL) are arranged at an angle to the lateral direction that is less than the average sipe angle $\alpha A$.

* * * * *